United States Patent
Haustein et al.

(10) Patent No.: US 10,979,474 B2
(45) Date of Patent: Apr. 13, 2021

(54) METHOD AND SYSTEM FOR A LOW-LATENCY AUDIO TRANSMISSION IN A MOBILE COMMUNICATIONS NETWORK

(71) Applicant: Sennheiser electronic GmbH & Co. KG, Wedemark (DE)

(72) Inventors: Thomas Haustein, Potsdam (DE); Dennis Wieruch, Berlin (DE); Thomas Wirth, Berlin (DE); Udo Krüger, Berlin (DE); Sebastian Georgi, Langenhangen (DE); Jan Watermann, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 16/475,811

(22) PCT Filed: Jan. 2, 2018

(86) PCT No.: PCT/EP2018/050005
§ 371 (c)(1),
(2) Date: Jul. 3, 2019

(87) PCT Pub. No.: WO2018/127466
PCT Pub. Date: Jul. 12, 2018

(65) Prior Publication Data
US 2019/0356718 A1    Nov. 21, 2019

(30) Foreign Application Priority Data

Jan. 4, 2017 (DE) .................... 10 2017 100 076.3

(51) Int. Cl.
*H04L 29/06* (2006.01)
*H04L 5/00* (2006.01)

(52) U.S. Cl.
CPC .......... *H04L 65/607* (2013.01); *H04L 5/0007* (2013.01); *H04L 65/80* (2013.01); *H04L 69/04* (2013.01)

(58) Field of Classification Search
CPC ....... H04L 5/0007; H04L 65/80; H04L 69/04; H04L 65/607; H04L 65/0007
See application file for complete search history.

(56) References Cited

U.S. PATENT DOCUMENTS

| | | | |
|---|---|---|---|
| 7,586,949 B1 * | 9/2009 | Barany | H04B 7/2656 370/335 |
| 2003/0152020 A1 * | 8/2003 | Schulze | H04L 1/007 370/206 |

(Continued)

FOREIGN PATENT DOCUMENTS

| | | |
|---|---|---|
| CN | 1493072 | 4/2004 |
| CN | 1947407 | 4/2007 |

(Continued)

OTHER PUBLICATIONS

Search Report for Application No. PCT/EP2018/050005 dated Mar. 23, 2018.

(Continued)

*Primary Examiner* — Christopher B Robinson
(74) *Attorney, Agent, or Firm* — Haug Partners LLP (57) ABSTRACT

A method of low-latency audio transmission in a mobile communications network utilizing first data frames or sub-frames encoded according to a first format and shorter second data frames encoded in another second format for audio data. An audio transmission system includes a terminal, a base station, and an audio receiver. The terminal transmits via an uplink audio data that are encoded in the second format and other data that are encoded in the first format. The audio receiver directly receives the audio data transmitted via the uplink. The encoding/decoding of the (Continued)

audio data of one of the second data frames is influenced by other audio data of the same second data frame but not by audio data of another second data frame. Audio transmission from the terminal to the audio receiver is effected in the allocated time slots and frequencies in a waveform in conformity with the mobile communications network.

18 Claims, 3 Drawing Sheets

(56) References Cited

U.S. PATENT DOCUMENTS

| | | | | |
|---|---|---|---|---|
| 2004/0054525 | A1* | 3/2004 | Sekiguchi | G10L 19/02 |
| | | | | 704/205 |
| 2007/0223660 | A1* | 9/2007 | Dei | G10L 19/24 |
| | | | | 379/88.13 |
| 2012/0269282 | A1* | 10/2012 | Jin | H04L 1/0065 |
| | | | | 375/267 |
| 2016/0174102 | A1* | 6/2016 | Asterjadhi | H04W 28/06 |
| | | | | 370/389 |
| 2016/0338112 | A1 | 11/2016 | Lee et al. | |
| 2016/0358617 | A1* | 12/2016 | Lesso | H04L 25/4902 |

FOREIGN PATENT DOCUMENTS

| | | | |
|---|---|---|---|
| CN | 102904851 | 1/2013 | |
| CN | 103947278 | 7/2014 | |
| CN | 104244424 | 12/2014 | |
| CN | 104535965 | 4/2015 | |
| CN | 106205580 | 12/2016 | |
| DE | 10 2015 117 057 | 4/2016 | |
| DE | 10 2015 210 873 | 12/2016 | |
| EP | 3 021 628 | 5/2016 | |
| JP | 5801434 B2 * | 10/2015 | H04W 52/241 |
| WO | WO2014208430 | 12/2014 | |
| WO | WO2016202804 | 12/2016 | |

OTHER PUBLICATIONS

Chinese Office Action and Search Report for corresponding Application No. 201880003244.1 dated Dec. 3, 2020.

* cited by examiner

METHOD AND SYSTEM FOR A LOW-LATENCY AUDIO TRANSMISSION IN A MOBILE COMMUNICATIONS NETWORK

The present application claims priority from International Patent Application No. PCT/EP2018/050005 filed on Jan. 2, 2018, which claims priority from German Patent Application No. DE 10 2017 100 076.3 filed on Jan. 4, 2017, the disclosures of which are incorporated herein by reference in their entirety.

FIELD OF THE INVENTION

It is noted that citation or identification of any document in this application is not an admission that such document is available as prior art to the present invention.

The present invention concerns a method and a system for audio transmission with a very low latency time by way of a mobile communications network, for example an LTE network.

For audio transmission by means of wireless microphone systems a delay time that is as short as possible for the acoustic signal is indispensable. Wireless microphone systems are used both in stage technology, for ENG (electronic news gathering) and in PMSE transmissions. In that respect PMSE means "programme making and special events", that is to say typically commentary uses by news television teams directly at the location of the event.

For acoustic transmissions a television viewer requires lip synchronization, for which reason a short latency time is required for the transmission of the acoustic signals. Time-shifted emission of the sound signal is perceived by the television viewer as being extremely disruptive as soon as the time shift exceeds a given threshold. In stage technology lip-synchronous transmission is also required; here however there is yet a further difficulty: if the signal is transmitted back to the performer (for example the singer) by IEM (in-ear monitoring) for checking his own singing the acoustic signal has to involve radio transmission twice, more specifically once from the microphone to the sound mixing desk and then as the signal mixed there back by way of the IEM transmitter to the IEM receiver of the artist who typically wears it on a belt. The signal is then output by that receiver to an in-ear earpiece. This therefore involves double the transit time by way of the radio link; added to that is a latency time which necessarily occurs by virtue of processing in the mixing desk of the sound engineer.

Tests have revealed that here a total delay time of 4 ms is already found to be disruptive. The longer it is, the more disruptive it becomes. Simultaneously hearing the direct sound and the delayed sound reproduced by the IEM system, in addition cancellation, give rise to disruptive comb filter effects which artists generally perceive as being extremely impeding in terms of their performance. In the extreme case, due to those effects (transit time plus comb filter effect) it can happen that singers or speakers are not able to complete their performance.

By virtue of those high demands on low transmission latency (that is to say short delay time) systems of that kind are hitherto implemented based on proprietary radio communication systems operated in specific frequency bands intended for that purpose. As these are proprietary systems they have to be appropriately developed (in the form of hardware and software and possibly integrated circuits which are used in that situation). Having recourse to integrated circuits which are inexpensively available for example for the mobile communication market is not possible.

The frequency bands for the wireless transmission of acoustic signals are also limited. If stage events are planned efforts have to be made beforehand to provide sufficiently free frequencies for the transmission. That however is not always possible in the case of spontaneous uses. Thus in the case of suddenly unplanned on-the-spot uses this can certainly involve complications because (for example in the case of natural disasters) a number of television teams rush immediately to the location of the disaster in order to provide up-to-date reports from there. Previous frequency coordination between them is virtually impossible in such situations as each team begins immediately with the commentary. In that case having recourse to a foreign authority would be advantageous, which deals with the allocation of communication frequencies. It would also be desirable for stage events which are taking place nearby if "their" frequencies did not run the risk of being disturbed by news gathering events which suddenly take place.

Moreover there is a noticeable trend to sell frequencies to the highest bidder for a given period of time (several years). That recently happened for wide frequency ranges as an auction to mobile communication providers. The frequency ranges, which are relatively narrow in relation thereto, for the use of wireless microphones were in that case still left out at the last auction and continue to exist as a protected resource only for that purpose. It is however foreseeable that there is a certain pressure on the political authorities to also release those ranges for general use.

It is therefore desirable to provide a method which would also permit the transmission of such acoustic (that is to say audio) signals in a standard method, as is standardized nowadays for mobile communication use. This is in fact used not only exclusively for mobile telephones but also permits a large number of other services (for example data transmission, file transfer and so forth). What is generally characteristic of those services however is that it is not important for them to have such short latency times as in the case of the above-discussed transmission of acoustic microphone data.

In the case of a normal telephone call using mobile telephones a markedly longer signal delay for example is not an important consideration because it is not perceived to be disruptive by the user. In fact the user does not know precisely when the other party to the telephone call begins to speak. Latency times in the range of up to 100 ms are therefore not noticeable in practice and can thus also not appear disruptive. The same boundary conditions apply in relation to data transmissions (for example in electronic discussion forums). Here even greater latency times would be admissible by the user demands. For file transfer (for example downloading documents or Internet sites) the demands are even still more relaxed: here latency times of 500 ms are certainly accepted. What is important in that respect (in the case of relatively large data files) is rather the mean transmission rate.

As therefore it is not important for the other services that the latency time is kept as short as possible, optimization of those networks was designed primarily on the basis of other development aims. For economic implementation therefore a method which has become standardized in the meantime was established, which can fulfill in the future the desired demands at the least possible effort and involvement (consumption of frequencies, energy efficiency and so forth). A short latency time did not belong to the high-priority development aims of the mobile communications networks. Accordingly a standard was established for the mobile communication networks, which does not guarantee a sufficiently short latency time for wireless microphone transmission of audio data: for example in the case of LTE transmission times of markedly above 4 ms occur due to the system involved. In mobile communications networks a base station forms separate connections to the participating mobile communication devices (terminals). In that respect in each connection each transmission direction can also involve different properties and is therefore implemented separately, that is to say each connection includes a downlink from the base station to the terminal and an uplink from the terminal to the base station. Data which are sent from a first terminal to a second terminal therefore firstly pass through an uplink of the first terminal and then (after it is possibly forwarded from the base station to which the first terminal or the transmitter is connected by way of a data/telephone network to another base station to which the second terminal or the receiver is connected) the data are passed from the receiver base station to the second terminal by way of the downlink thereof. In that case the data are decoded in the transmitter base station in order to check the correct reception thereof. Only correctly received data are forwarded by the (transmitter) base station while defectively received data are rejected thereby and can be requested afresh. For that purpose for example in LTE the configuratable H-ARQ (hybrid automated repeat request) on ISO/OSI layer 2 is used.

The above-described mechanism is in principle effective even if both terminals are registered at the same base station: the data received from the first terminal by way of the uplink are checked or requested afresh by the base station and then converted to other frequencies in order then to take the downlink of the second terminal. In that case the above-mentioned latencies are of markedly more than 4 ms.

SUMMARY OF THE INVENTION

An object of the invention is in particular to provide a wireless transmission method for microphone systems (or for audio data generally) which can be used within a mobile communications network, for example the LTE network. That is achieved according to the invention by the method keeping as accurately as possible to the standards applied there, so that it can also be managed by the base stations, but in that respect has particularities that go beyond the standard. In that respect the method according to the invention can enjoy the numerous advantages of the mobile communications network, but in that case operates at any event in conflict-free manner in the frequency ranges used there. That freedom from conflict concerns on the one hand the logical format of the emitted data, that is to say it complies with the current approval rules for example in the LTE networks and accordingly can be used in the frequency bands thereof. On the other hand however certain coordination tasks can also be dealt with by the mobile communications base station. In particular the base station tolerates the format emitted by the wireless microphone to such an extent that it does not terminate those connections if it considers the data disposed therein as being defective. In accordance with the invention use is made of the fact that the transmitter (therefore the wireless microphone) and a receiver of the audio transmission system are connected to the same base station so that the receiver can have direct access to the data transmitted by way of the uplink of the transmitter. That can alternatively also be possible in arrangements in which the transmitter and the receiver are connected to different base stations which however are arranged near each other. Nonetheless both the transmitter (which hereinafter is also referred to as the terminal) and also the receiver are regularly registered in accordance with the applicable rules of the respective mobile communications standard being used as subscribers at the base station so that for example check data can be transmitted by way of that connection. The receiver gets the actual audio data directly from the uplink of the terminal. It can be suitably configured by the base station, for example by same permitting it access to the uplink of the terminal.

Thus it is then also possible to use for the hardware of such wireless microphone systems for the transmission of audio data the electronic integrated circuits (ICs) which have actually been developed for mobile communications. This contributes to unifying the network infrastructure as well as a better price for the systems.

The object of the invention is attained by a method of low-latency audio transmission in a mobile communications network and by an audio transmission system as set forth in the appendant claims which includes at least one wireless microphone and receiver. Here, a transmission method is deemed to be low-latency, which reliably attains a latency of below 4 ms for a continuous audio data stream.

Thus there is provided a method of low-latency audio transmission in a mobile communications network. An audio transmission system has at least one terminal, a base station and an audio receiver. Audio data are sent from the at least one terminal by way of an uplink, by way of which the terminal is wirelessly connected to the base station. An audio receiver wirelessly connected to the same base station directly receives the audio data sent from the terminal by way of the uplink. Admittedly the base station also receives said audio data but cannot decode them by virtue of a encoding which is not in conformity with the standard but which is known to the terminal and the audio receiver. Frequency resource allocation for the terminal is persistently effected by the base station in an embodiment, that is to say it is effected in such a way that the terminal can send a continuous data stream. Audio transmission in the allocated resources from the terminal to the audio receiver is effected in a waveform which is in conformity with the respective mobile communications standard. While however in accordance with the usual mobile communications standard the transmitted data can be encoded and decoded only in blocks of so-called subframes, which for example in the case of LTE last at least 1 ms, in accordance with the invention the audio data are encoded in shorter blocks so that the audio receiver can already decode and process audio data before a complete subframe was received. In that respect the base station can behave in that respect in conformity with the standard so that it is not capable of decoding the data received from the terminal by uplink and therefore does not forward same to the audio receiver by way of the downlink thereof. As however the audio receiver according to the invention receives the data directly from the uplink of the terminal it nonetheless receives the data. In that respect the usual conversion in the base station to the downlink to the receiver is omitted whereby the latency of the system is further reduced.

The receiver therefore represents a particular kind of device as it is admittedly registered in the mobile communications network as a mobile terminal, but nonetheless it is capable of receiving the uplink; that is normally reserved only to the base station.

According to an aspect of the present invention the transmitted code of the audio data is concluded or terminated after a shorter time than prescribed in the respective mobile communications standard. Conclusion or termination denotes in that respect that encoding or decoding of the data of a data frame is influenced by other data of the same data frame, but not by data of other data frames. In an embodiment the transmitted code of the audio data is concluded or terminated at the most every two OFDM symbols. This means that an encoder or decoder which normally serially processes sequences of a plurality of data bits and is normally only shifted into a starting state again at the end of the subframe is already shifted into its neutral starting state again after a shorter number of bits which are modulated on a maximum of two OFDM symbols. That reduces the latency time of the transmission because the decoder can already begin with decoding earlier, for example after two completely received OFDM symbols, without having to wait for the end of the subframe, as would conventionally be usual. In the transmission of audio data according to the invention that also makes it possible to achieve reduced latency times of markedly below 4 ms in a mobile communications network.

In an embodiment of the present invention the mobile communications network corresponds to the LTE standard. In another embodiment the mobile communications network corresponds to the WiMAX standard. In a further embodiment the mobile communications network can correspond to another standard which is based on a multi-carrier method like for example OFDM (orthogonal frequency division multiplex) and/or encoding of symbols on a subframe plane.

According to a further aspect of the present invention encoded and decoded data groups or OFDM symbols can jointly contain a checksum (for example CRC). In an embodiment a CRC can be transmitted in each OFDM symbol. That checksum can be in addition to a checksum (possibly provided by the mobile communications standard) about the subframe and is independent thereof.

The invention also concerns a wireless pocket transmitter for a microphone which is configured for operation as a mobile terminal in a mobile communications network and which includes: a first encoding unit which encodes data to be transmitted from the terminal in accordance with a first format used in the mobile communications network, a high-frequency modulation unit for modulation of the data encoded in accordance with the first format in accordance with a modulation method used in the mobile communications network, wherein the modulated data are transmitted by way of an uplink, and a second encoding unit which acquires audio data from a microphone unit and encodes it in accordance with a second format. In accordance with the second format the first data frames are divided into an integer number of second data frames, wherein the second data frames are shorter than the first data frames and contain the audio data encoded in accordance with the second format. The second data frames are terminated, that is to say encoding of the audio data of a second data frame is influenced by other audio data of the same second data frame but not by audio data of another second data frame. The wireless pocket transmitter can also be in the form of a wireless microphone and contain a microphone unit which contains a microphone capsule and outputs audio data recorded by the microphone capsule. The microphone unit can be integrated into the wireless pocket transmitter or the wireless microphone (for example in the form of a wireless hand microphone) or can be connected thereto as a separate element. That connection of the microphone unit can be wired or wireless by way of a separate connection.

In addition the invention concerns a wireless audio receiver which is configured for operation in a mobile communications network, comprising a high-frequency demodulation unit for demodulation of received data in accordance with a demodulation method used in the mobile communications network, a first decoding unit and a second decoding unit. The high-frequency demodulation unit outputs demodulated data which are encoded either in accordance with a first format used in the mobile communications network or in accordance with another second format, wherein the same demodulation and the same high-frequency range are used independently of the format. The first decoding unit decodes those demodulated data which are encoded in accordance with the first format used in the mobile communications network and the second decoding unit decodes those demodulated data which are encoded in accordance with the second format. While the first format uses first data frames and the first decoding unit decodes the data frame-wise in accordance with the first data frames, in accordance with the second format the first data frames are divided into an integer number of second data frames, wherein the second data frames are shorter than the first data frames and contain audio data encoded in accordance with the second format. Decoding of the data of each of the first data frames is influenced by other data of the same first data frame but not by data of other first data frames. Likewise decoding of the data of each of the second data frames is influenced by other data of the same second data frame but not by data of other second data frames.

The invention also concerns an audio transmission system in a mobile communications network which includes a wireless microphone operating as a terminal, a base station and an audio receiver. In that case the terminal is adapted to send data by way of an uplink in a waveform which conforms with a waveform used in the mobile communications network. The terminal uses the frequencies and time slots allocated by the base station for the uplink alternatively for transmitting both first frames which are encoded in accordance with a first format and also second frames which are encoded in accordance with the second format.

Advantages and embodiments by way of example of the invention are described in greater detail hereinafter with reference to the drawings.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art.

Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
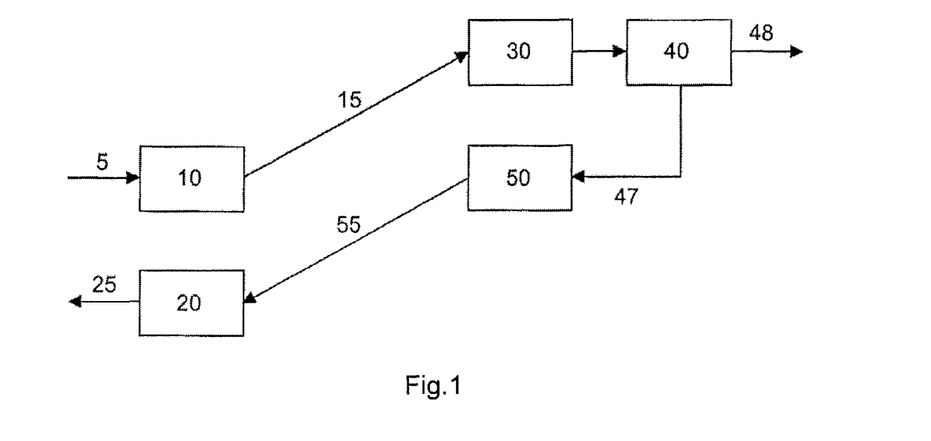
FIG. 1 shows a block circuit diagram of a wireless microphone with an in-ear feedback channel according to the state of the art.

FIG. 1 shows a wireless microphone for audio transmission with a wireless feedback channel according to the state of the art. A microphone signal 5 is passed to a transmitter 10 which provides for modulation and emission of the signal. The signal by way of the radio link 15 reaches the receiver 30 which demodulates the signal and passes it to the mixing desk 40. Here typically the signals of various receivers come in, are mixed in there and are prepared by way of the arrow 48 for further processing (public address system, recording, TV transmission and so forth). A signal which is especially mixed for the user of the microphone (for example artist) passes by way of the path 47 to the IEM transmitter 50 (IEM=in-ear monitoring). That transmitter 50 sends the signal 55 modulated thereby on a further radio frequency back to the in-ear receiver 20 to the user. The receiver 20 demodulates the signal and outputs it by way of the path 25. Typically it is then monitored by the user by way of an in-ear earpiece.

The microphone signal 5 can also represent an electrically captured instrument signal (for example from a guitar). If the artist for example sings (by way of a microphone) and plays an instrument the transmitter 10 and the receiver 30 are present in duplicate. In general then a signal mixed in accordance with the demands (singing and guitar) is passed from the mixing desk to the transmitter 50. The transmitter 50 and the receiver 20 for the feedback channel are therefore present only once (for each artist).

For each artist or instrument therefore the corresponding devices transmitter 10, receiver 30, feedback channel (for example in-ear) transmitter 50 and feedback channel (for example in-ear) receiver 20 are to be provided. The mixing desk 40 which receives the various input signals from the receivers 30 and after mixing provides the output 48 and the outputs 47 for each artist or each instrument is provided only the once.

Referring to FIG. 1 it can be seen that the artist gets his own signal 25 back only after passing through two radio links 15 and 55 and thus hears it. Therefore the transit times of the two radio links are added. That leads to the above-described disruptive effects with a duration of more than 4 ms.

The time for passing through the radio link in that respect is not to be interpreted as a pure transit time for the electromagnetic wave from transmitter to receiver. As that wave is propagated at the speed of light it is certainly short enough and does not cause disruption. Rather here the term transit time is used to mean the duration that the entire transmission method requires. That is to say, this means the time which is required for processing of the incoming acoustic signal, intermediate storage of the digitized acoustic signal in the period of time in which transmission cannot be effected, modulation, amplification in the transmitter, the wave transit time to the receiver, pre-amplification in the receiver, demodulation, intermediate storage of the signal which is possibly received in parallel but is to be output serially, amplification of the demodulated signal and output of that signal. If in accordance with the state of the art for example analog frequency modulation is used then all those times are sufficiently short so that hitherto they had to be considered only in exceptional cases. In that respect however when using digital audio technology there are processing times which run counter to the described application or in the worst-case scenario can even prevent it.

Figure 2:
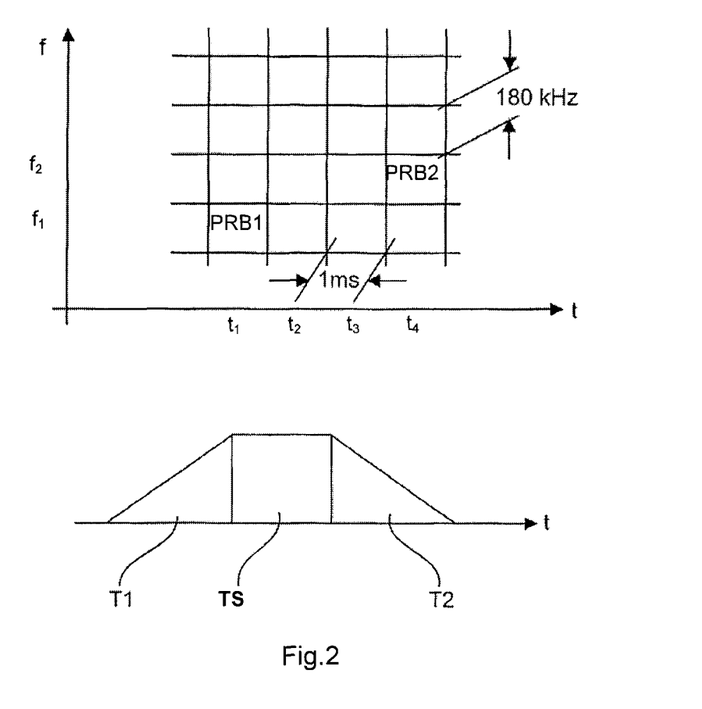
FIG. 2 shows a diagrammatic view of a data format used in the LTE network.

FIG. 2 shows the relationships in the LTE mobile communications network which is current at the present time. It shows the state of the art and describes the occurrence, due to the system, of the transmission times of markedly over 4 ms. Radio transmission systems in the mobile communications area, for example LTE or WiMAX, use multi-carrier methods for efficient distortion correction of the radio channel. In addition a time procedure is established, the so-called frame (radioframe or frame). That is subdivided into sub-frames which in LTE each last for 1 ms and include the whole frequency spectrum used. In order to be able to supply more or fewer users with data at the same time in a flexible manner, the radio resources are subdivided into "physical resource blocks" (PRBs). For example in LTE there is a PRB comprising 12 OFDM subcarriers in the frequency direction (in total 180 kHz) and 14 OFDM symbols in the time direction (in total 1 ms). A different number of PRBs are allocated to the users in order to be able to flexibly meet their various data rate demands. In that respect conclusion of error protection is inherent in the system over a subframe which corresponds in LTE to a time interval of 1 ms.

FIG. 2 shows in the frequency domain f in relation to time t a portion of the so-called "radioframe" which in the case of LTE lasts 10 ms. A base station in the LTE network respectively assigns in time slots of 1 ms duration 180 kHz wide frequency ranges for use to the various users, namely the "physical resource blocks" (PRBs). Each user may use those frequency ranges allocated to him by the base station for the time allocated to him. For example, a first physical resource block PRB1 an be associated with a user for his uplink in a frequency range $f_1$ and a subframe or time slot $t_1$ and a second physical resource block PRB2 can be associated in another frequency range $f_2$ and another time slot $t_4$. A so-called persistent association occurs when at least one required quantity of physical resource blocks is associated with a user in each subframe or time slot so that he can continuously transmit (audio) data without having to provide for intermediate storage thereof. In that case the data format within those subframes which LTE are 1 ms long is subject to certain rules. The base station which inter alia is connected to or contains its own transmitting unit and receiving unit is responsible for overall coordination of the individual subscribers. It assigns the PRBs to the individual subscribers, equalizes out the transit time differences occurring due to the differing distances between the subscribers, accepts the data blocks by its receiving unit and decodes the data contained in those blocks. If the data are intended for receivers which are also in range of the base station then it decodes those data afresh in accordance with the demands of the receivers and forwards them to the transmitting unit thereof.

Encoding and preparation of the data intended for the time slot of 1 ms duration typically requires 1.5 ms T1, as shown in the lower part of FIG. 2. Decoding and checking of the data also requires 1.5 ms T2. Actual emission or transmission is effected during the time TS (1 ms). Accordingly in total an overall processing time of 4 ms (=1.5 ms+1 ms+1.5 ms) already comes together for those steps in known LTE systems. That is the minimum transit time per direction in the regular LTE protocol.

That can inter alia also be prolonged by virtue of the fact that the data are found to be defective or data packets are lost. In those case the defective data block is not forwarded but the base station further requests those data at the transmitter a further time. That naturally gives rise to additional time delays. It is apparent that such a conventional system operating under normal conditions cannot meet the requirements for a transit time of less than 4 ms for the forward and return path. That total processing time on the part of the base station of 4 ms is possibly not the technically minimum attainable lower limit; rather it was established when designing the whole LTE system in that way because then all demands made on the system could be attained with the lowest level of effort and expenditure. That is therefore the time that all LTE base stations accordingly also observe as they must naturally keep to the standard in order to be able to communicate with the external devices (mobile telephones). Those time parameters are so selected that they are sufficiently short in respect of the desired situations of use in mobile communications. In regard to telephony use that does not represent a restriction. Any kind of data transmission which does not involve speech data and which is provided as standard for the LTE network makes demands here which are still much lower in terms of latency time. The described situation of use of transmitting audio data by way of wireless microphones is however usually not taken into consideration in the specification of mobile communications networks, instead protected frequency ranges are often kept free for those purposes.

Figure 3:
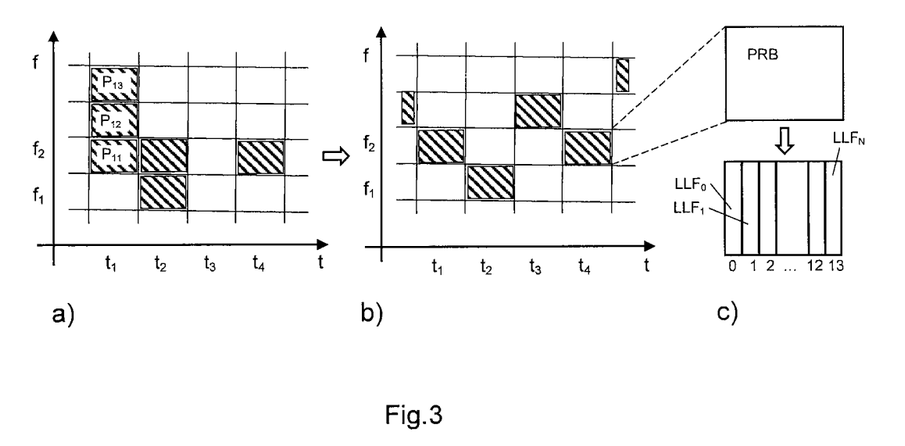
FIG. 3 shows a use according to the invention of the data format used in the LTE network.

FIG. 3 shows a use according to the invention of the data format employed in the LTE network. FIG. 3a) once again shows a conventional configuration. A scheduler in the base station assigns three PRBs $P_{11}$-$P_{13}$ to a given user, for example in a subframe $t_1$. In the following subframes $t_2$-$t_4$ first two PRBs then no PRB and then a single PRB are allocated to the same user. On average over four subframes therefore the user has 1.5 PRBs. The user however cannot transmit continuously as for example in $t_3$ he does not have any PRB available. According to the invention the user in each subframe obtains a given amount of PRBs, for example a respective PRB, as shown in FIG. 3b). In addition the PRBs are admittedly transmitted as standard in accordance with LTE or in accordance with the respective mobile communications network, but the data transmitted in the PRB are not conventionally encoded in accordance with the invention. Therefore the waveform of the transmitted signal admittedly corresponds to the LTE standard, but not its content. While conventionally all data transmitted in the PRB are jointly encoded and terminated the PRB in accordance with the invention is divided into portions $LLF_0$, $LLF_1$, ..., $LLF_N$ (so-called "low latency frames"), as in FIG. 3c). In general the PRBs represent first data frames of 1 ms duration while the portions $LLF_0$, ..., $LLF_N$ represent second shorter data frames of for example ⅐ ms duration. Each portion corresponds to one or more OFDM symbols or carrier frequencies. In the case of LTE where the PRB contains 14 OFDM symbols for example it is possible to use two portions each having seven symbols or seven portions each having two symbols. In principle it would also be possible to use 14 portions each having one symbol; however occasionally check data have to be transmitted in an PRB so that not all OFDM symbols are available for the user in each PRB. An advantage of this configuration with persistent association and further subdivision of the subframes is that user data (in particular audio data) can be transmitted in each subframe and thus a reduction in latency is achieved although the signal externally appears as a "normal" LTE signal and can be transmitted within the LTE network. The latency reduction is achieved in that the data transmitted in the portions (that is to say the second data frames) are terminated, that is to say encoding and decoding of the data of a second data frame (for example $LLF_0$) is influenced admittedly by other data of the same second data frame but not by data of another second data frame ($LLF_1$).

Figure 4:
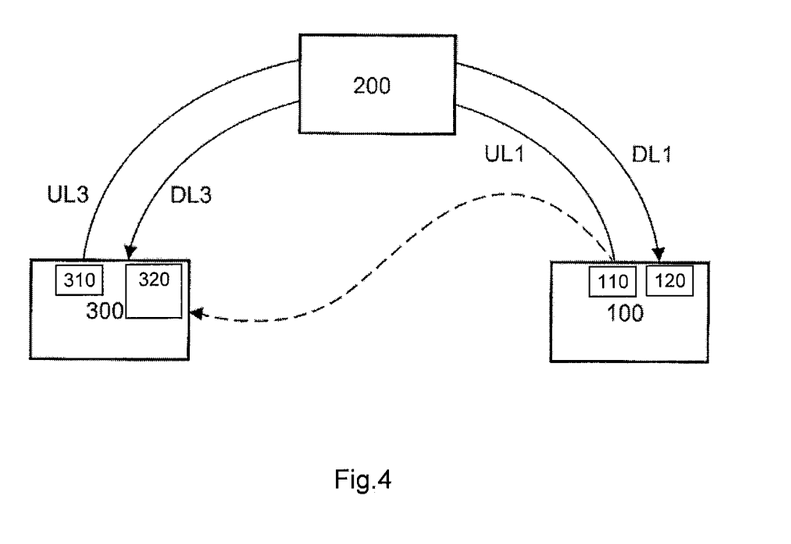
FIG. 4 shows a diagrammatic view of an audio transmission system according to the invention.

FIG. 4 shows a diagrammatic view of an audio transmission system according to the invention. The invention concerns a system for and a method of low-latency audio transmission in a mobile communications network, in particular for a "programme making and special event" system (PMSE), thus like for example a wireless microphone system.

The audio transmission system according to an embodiment of the invention represents an LTE-conforming audio transmission system. The audio transmission system has a terminal 100 which for example can be in the form of a wireless microphone. In addition there is an LTE base station 200 which permits LTE-conforming transmission of data. The terminal 100 is connected to the base station 200 by way of an uplink UL1 and a downlink DL1. In that case the data transmitted by way of the uplink UL1 are encoded in an encoder contained in a mobile communications transmitting unit 110 and the data received by way of the downlink DL1 are decoded in a decoder contained in a mobile communications receiving unit. According to the invention the mobile communications transmitting unit 110 contains a second encoder or an encoder which, besides its standard-conforming functionality, can also perform an encoding modified in accordance with the invention in a second operating mode. In addition there is at least one audio receiver 300 representing an LTE-conforming subscriber modified according to the invention. It is connected to the base station 200 by way of an uplink UL3 and a downlink DL3. The audio receiver 300 also contains a mobile communications transmitting unit 310 with an encoder and a mobile communications receiving unit 320 with a decoder modified according to the invention. The terminal 100 can wirelessly transmit audio data and other data, wherein that transmission in both cases is effected in conformity with the waveform of an LTE system. The audio transmission system is LTE-conforming insofar as the signals produced by the terminal 100 for all network components appear as if the terminal 100, the base station 200 and the audio receiver 300 are quite normal LTE network subscribers as all parameters of modulation on the symbol plane are identical to the parameters usually employed. In actual fact the terminal 100, the base station 200 and the audio receiver 300 can behave completely in LTE-conforming fashion, for example for the transmission of control and check data. For that purpose a first encoding unit is used in the terminal 100 and a first decoding unit is used in the audio receiver 300. For the transmission of audio data however the terminal 100 and the audio receiver 300 use a mode of operation in which the bits themselves, which are sent in the subframes, are encoded otherwise than usual. They are therefore not decodable for other LTE-conforming network subscribers (including the base station 200) as LTE-conforming error checking (CRC, cyclic redundancy check) cannot be successful. The mobile communications transmitting units 110, 310 and the mobile communications receiving units 120, 320 can therefore operate on the one hand for communication with the base station 200 in completely LTE-conforming fashion. On the other hand however the mobile communications transmitting unit 110 and the mobile communications receiving unit 320, for direct communication with each other, can use a modified code which cannot be decoded by the base station 200. In both cases the encoded bits are transmitted in the form of an LTE-wave-conforming signal.

Both network subscribers 100 and 300 can be configured and synchronized by the base station 200. The base station 200 allocates sufficient 1 ms subframes to the transmitting terminal 100 so that it can transmit the audio data without interruption. This means that at least one 1 ms subframe with the corresponding frequency resources per 1 ms, that is to say at each time, is available to the terminal, as described above.

Emission of the encoded audio data is effected by the terminal 100 in those allocated time slots. Those data appear to be entirely normal data packets for other network subscribers as the waveform is compatible. The internal data structure in which the actual useful data (also referred to as the payload) are encoded by means of error-detecting and error-connecting codes, does not however correspond to the LTE standard. Therefore the base station 200 also cannot decode those data packets. It can and should therefore be ensured that it does not request further transmission of the data packet (retransmission) from the terminal 100 and nonetheless continues to make interruption-free subframes available to the terminal 100, in which it can transmit.

The audio receiver 300 according to the invention listens in on the data transmitted by the uplink UL1 from the terminal 100. The moments in time and frequencies used for that purpose are in fact sent from the base station 200 to the subscribers, wherein normally there are sent to each subscriber only the time slots and frequencies applicable to that actual subscriber. According to the invention however the audio receiver 300 is notified of the time slots and frequencies applicable to the uplink UL1 of the terminal 100 so that it can receive the data transmitted there. As it knows the encoding, which is not in accordance with the standard, of the data of the terminal uplink UL1 it can also decode them. In addition it can already begin with the decoding operation earlier (that is to say before the end of a subframe) as encoding is effected in such a way that decodable data are already available during the subframe, that is to say before complete expiry of the 1 ms period of time. It can thus begin with decoding earlier than a standard LTE device and make the audio data available to the subsequent external device (for example the mixing desk). The base station 200 does not notice anything thereof; the transmitting data are therefore received both by the audio receiver 300 and also by the base station 200. In that case the base station 200 can completely ignore those received audio signals, that is to say the actual useful data which are not decodable for the base station. Accordingly the audio receiver 300 does not acquire its audio data to be processed from the base station 200 but directly from the terminal 100.

The data format used between the terminal 100 and the audio receiver 300 does not have to correspond on the bit plane to the mobile communications standard, for example LTE, as it does not have to be assessed by the base station 200. That is an advantage of the invention. As the data packets are put into a waveform compatible with the respective mobile communications standard by means of the same modulation that kind of transmission of acoustic data can be used in normal mobile communications networks. It will be noted however that the data format within that condition can be freely defined so that the relatively long latency times in the mobile communications network can be reduced.

The connection according to the invention between a terminal and a receiver can replace the microphone radio link 15 or the feedback radio link 55 or both links 15, 55 in a structure as in FIG. 1.

Because of the smaller amount of data in the case of LTE neither the 1.5 ms (T1) for preparation of the data nor the 1.5 ms (T2) for decoding of the data in the same length needs to be utilized, but shorter time portions can be used for that purpose. In addition it is already possible to begin with transmission of the useful data before all data for the subframe time slot are completely calculated. As described above that subframe is still subdivided into a plurality of shorter frames or OFDM symbols, for example in the case of the LTE network the 1 ms (TS) subframe contains 14 OFDM symbols. As a part thereof (conventionally 50%) contains LTE synchronization information and cannot therefore be readily used it is possible for example to combine together two respective OFDM symbols and thus already transmit after $\frac{1}{7}$ ms. Alternatively it may also be possible to use individual OFDM symbols and at least at times to dispense with LTE synchronization information because fewer items of synchronization information are required by virtue of the fact that the terminal and the audio receiver communicate with the same base station.

Transmission according to the invention therefore becomes faster at three locations: the respective 1.5 ms for preparation (T1) and the 1.5 ms for decoding (T2) of the data can be crucially shortened and in addition transmission of the data within the 1 ms time slot (TS) can begin markedly earlier (for example after just $\frac{1}{7}$ ms instead of after 1 ms). In total that gives a substantially shorter latency time for the transmission of the audio data.

Accordingly it is now possible within existing mobile communications networks to provide for transmission of (for example acoustic) data which is effected with a decidedly shorter latency time than conventional data transmission so that this kind of transmission also permits latency-critical applications. In the best-case scenario therefore in the case of LTE, instead of the 4 ms latency time, this achieves an improvement by a factor of 7, that is to say only $\frac{4}{7}$ ms (<0.572 ms) is required for each radio link.

Communication in the mobile communications network between the terminal 100 and the base station 200 or between the audio receiver 300 and the base station 200 respectively therefore takes place except for encoding of at least of a part of the useful data, in conformity with all protocols of the network. Accordingly the terminal 100 and the audio receiver 300 can also exchange check data by way of the base station 200.

Transmission of the latency-critical audio signals is effected in conforming relationship with the waveform of the mobile communications network. The transmitted symbols therefore do not generate any disruptions for other subscribers in the network. Block-wise decoding of the bits received in a subframe modified according to the invention however is not possible by the base station 200.

Figure 5:
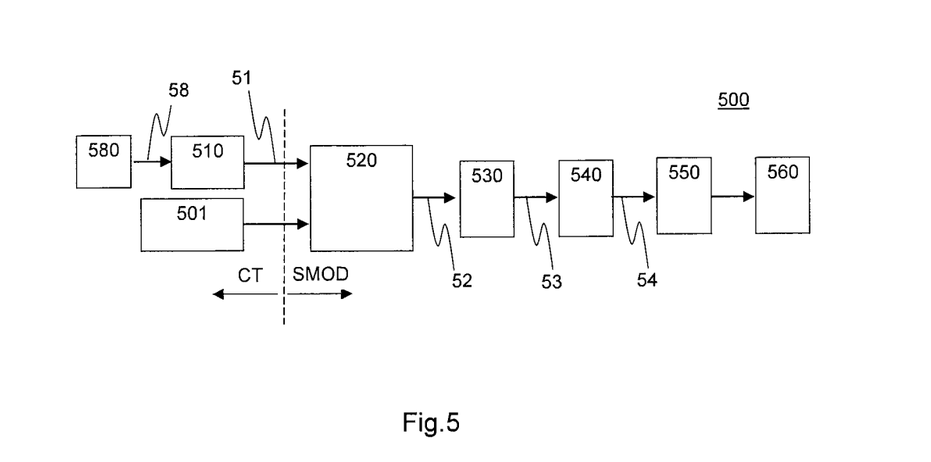
FIG. 5 shows the structure of an LTE unit on the transmission side.

FIG. 5 shows by way of example the structure of an LTE unit 500 on the transmitting side, for example corresponding to the mobile communications transmitting unit 110 in the terminal 100. The LTE unit 500 contains an encoding and termination unit CT as well as a standard-conforming LTE modulation unit SMOD. The encoding the termination unit CT contains a first encoding unit 501 and a second encoding unit 510. The first encoding unit 501 performs encoding and termination in accordance with the LTE standard, for example for the transmission of check data. The second encoding unit 510 receives the audio data 58 to be transmitted (for example from a microphone unit 580) and generates the bits 51 which are encoded according to the invention. For that purpose it includes an encoder like for example a convolution encoder or a turboencoder. In addition it can contain other modules like for example interleavers, pointers, scramblers, CRC-checksum generators and so forth. The audio data bits are encoded and terminated in the encoding and termination unit CT. Then the encoded and terminated audio data bits 51 are passed to the LTE modulation unit SMOD which produces therefrom a signal which is waveform-compatible with the LTE standard. Alternatively the LTE modulation unit SMOD can also produce a signal which is waveform-compatible with the LTE standard from the data obtained by the encoding unit 501. The LTE modulation unit SMOD is substantially conventional and in this example contains a modulator 520, for example for QPSK or QAM which produces complex symbols 52, a mapping unit 530 which allocates the complex symbols 52 in LTE-conforming relationship to the PRBs and which produces a signal 53 in the frequency domain, and an IFFT unit 540 for carrying out an inverse fast Fourier transform which once again produces a signal 54 in the time domain. That is supplemented in a prefixing unit 550 by a prefix (CP, cyclic prefix) and finally converted in a high-frequency (HF) transmitting unit 560 into an HF transmission signal before that is sent by way of the uplink.

Going back to FIG. 4, an LTE-conforming check channel can also be present between the base station 200 and the terminal 100, which uses others than the PRBs occupied by the audio signal and by way of which it is possible for example to transmit which radio resources the terminal 100 is to use for the uplink communication UL1 from the terminal 100 to the base station 200. In that case PRBs occupied by the audio signal and PRBs occupied by other signals can be produced at the same time and transmitted in different frequency bands at the same time. In an embodiment the base station 200 allocates the radio resources in such a way that the terminal 100 can continuously transmit a (audio) data stream by the uplink UL1. In addition in an embodiment the radio resources are so divided that they are persistently allocated. In an embodiment the same frequency (for example the same OFDM subcarrier) can always be used at least for the duration of the connection. In that case therefore the receiver 300 can dispense with the channel assessment which is usually continual in the LTE communications network and thus gains time for the transmission data. The bandwidth of the radio resources is adapted to the required data rate of the terminal 100 so it is possible to provide a secure transmission without repeated transmissions (retransmissions) being required.

Figure 6:
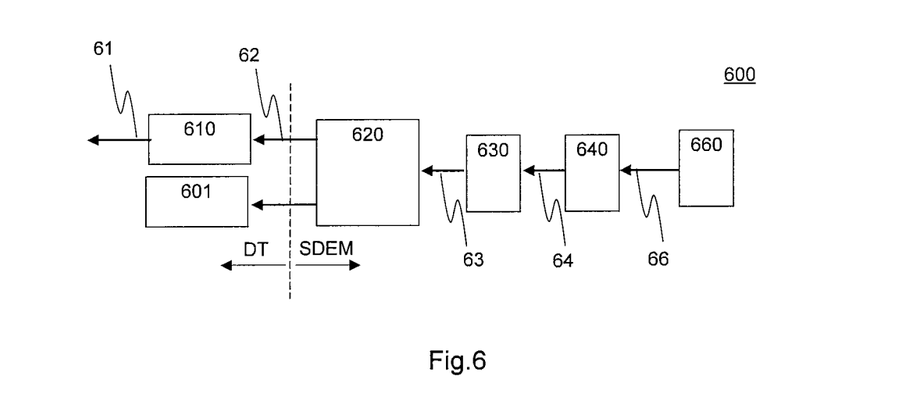
FIG. 6 shows the structure of an LTE unit on the receiving side.

A mobile communications receiving unit 320 used on the receiver side 300 for example an LTE unit 600 shown in FIG. 6, is of a structure comparable to the LTE unit 500 shown in FIG. 5. It includes an LTE demodulator unit SDEM which is waveform-compatible with the LTE standard and a decoding and termination unit DT. In the LTE demodulator unit an HF receiving unit 660 receives a signal and synchronizes it, an FTT unit 640 produces a frequency domain signal 64 from the synchronized time domain signal 66, and an extraction unit 630 selects given PRBs from the frequency domain signal 64 and extracts therefrom complex symbols 63 which are then demodulated in a demodulator 620, for example with QPSK or QAM. The decoder and termination unit DT in addition to a first conventional decoding unit 601 contains a second decoding unit 610 for example a convolution decoder or turbodecoder which gets the audio data bits 61 back from the demodulated signal 62. In addition the second decoder unit 610 can contain further modules like for example de-interleavers, de-scramblers, CRC check modules and so forth. In that case the second decoder unit 610 does not have to wait to the end of the subframe, like the first conventional decoder unit 601, but can already begin with decoding after a few received OFDM symbols, and output decoded audio data 61, more specifically as soon as the data contained in the symbols are terminated. In other words the decoding of those received and demodulated audio data 62 which are encoded in accordance with the second format in the shorter second data frames is influenced only by other audio data of the same second data frame but not by audio data of another second data frame, as described above. Therefore, directly after reception or demodulation of the second data frame, decoding thereof to afford audio data can be carried out. In addition for example it is possible to check a CRC checksum contained in the bit sequence or the audio data. The bit sequence is then passed to the next processing stage.

As can be seen from the foregoing description the components of the audio transmission system differ from conventional usual network components as follows. The terminal 100 can behave like a normal network subscriber, except that in addition it uses a second encoding unit 510 or in a second mode of operation of its mobile communications transmitting unit an encoding procedure in which data to be transmitted are already terminated after a shorter time than usual. The base station 200 can behave like a normal base station, except that, in the case of payload data, which it receives by way of the uplink UL1 of the terminal 100 and which are not decodable for it, it should not request renewed transmission. In addition in an embodiment in respect of the audio receiver 300 the base station 200 can prepare configuration data for the terminal uplink UL1 so that the audio receiver can receive the data directly from the terminal. The audio receiver 300 can also behave like a normal network subscriber except that it can additionally obtain access data for the terminal uplink UL1, can set itself to that terminal uplink UL1 and can receive data directly therefrom. In addition a second decoding unit in the mobile communications receiving unit 320 of the audio receiver 300 can decode the encoding used by the second encoder in the mobile communications transmitting unit 110 of the terminal, in which respect in particular less data are terminated than usual. For that purpose the audio receiver 300 can contain a check unit and/or a configuration data unit for example in the mobile communications receiving unit 320. The check unit checks for each group of jointly decoded OFDM symbols a checksum CLC contained in the decoded data. The configuration data unit can store first and second configuration data, in which case the first configuration data specify the uplink UL3 and/or the downlink DL3 of the audio receiver 300 and the second configuration data specify the uplink UL1 of the terminal 100.

An encoder in the second encoding unit 510 contains a plurality of registers as delay or storage elements. At its input the encoder receives a bit sequence which is to be encoded and which passes through the registers. Therefore the value of a currently output bit and therewith also the OFDM symbol produced therefrom depend on a plurality of preceding input bits. Termination of the data can be effected by the effect of previously received bits on the output signals being concluded. That can take place for example by the encoder being returned to a defined starting state in which its registers are "empty", that is to say for example contain the value zero ("0"). For example the data can be terminated by sufficient zero bits (0) being appended to the input sequence. When they are read into the encoder 510 then after a certain time all its registers are at the value zero and the encoder is reset to its starting state.

While termination of the bits distributed to OFDM symbols is effected in accordance with the standard in LTE only once per subframe, that is to say after 1 ms or fourteen OFDM symbols, the invention provides that the termination of the data is already effected after fewer than fourteen OFDM symbols, for example after seven OFDM symbols. In this case the bit sequence contained in the OFDM symbol can already be passed on after a fraction of the subframe and therefore with a markedly shorter latency. A further reduction in latency is already possible after two OFDM symbols upon termination. In an embodiment of the invention termination is already effected after each individual OFDM symbol so that the bit sequence contained in the OFDM symbol can be forwarded with minimum latency.

The radio resources of the transmission system are preferably in an IMT band (IMT=International Mobile Telecommunications) or in a band intended for the licensed use of IMT technology.

Preferably the terminal 100 is capable of being operated in various IMT bands. The terminal 100 is further adapted to support the standard protocols of the respective mobile communications standard for link construction and for resource control. In the uplink UL1 the terminal uses the radio resources allocated by the base station in accordance with the rules of wave formation in the uplink path, more specifically in the example of LTE:

Encoding→pointing→modulation→DFT→mapping to PRBs→IFFT→guard interval

There are some modifications in addition thereto. In an embodiment the code is concluded for each OFDM symbol. In another embodiment the code is concluded for each pair consisting of two OFDM symbols. Therefore each symbol or each pair of symbols can be decoded immediately after reception without having to wait for the end of the subframe. A CRC checksum about the symbol can be contained in the code of the OFDM symbol for error checking. An additional CRC about the subframe can be transmitted thereafter, as is usual in LTE.

According to the invention it is provided in particular in one of the higher protocol levels that in this case termination of the connection on the part of the base station does not occur. It can also be provided in one of the higher protocol layers that data about the uplink UL1 of the terminal can be communicated to the receiver so that it has access to the data of the uplink. Alternatively the receiver can also receive that information differently, for example directly from the terminal.

In general in an embodiment the invention concerns a method of low-latency transmission of audio data in a mobile communications network, which has at least one terminal 100, a base station 200 and an audio receiver 300. The method includes at least the steps: transmitting data from the at least one terminal 100 to the base station 200, wherein the data are encoded in accordance with a first format and the encoded data are modulated in accordance with a first high-frequency modulation method and transmitted by way of an uplink UL1, transmitting audio data from the at least one terminal 100, wherein the audio data are encoded in accordance with a second format and the encoded audio data are modulated in accordance with the first high-frequency modulation method and transmitted by way of the uplink UL1, wherein transmission of the audio data from the terminal 100 to the audio receiver 300 is effected in a waveform in conformity with the mobile communications network and direct reception of the audio data transmitted by way of the uplink UL1 in the second data frame $LLF_0$ by the audio receiver 300.

In that case the first format uses first data frames PRB1 and the terminal 100 and the base station 200 encode and decode the data frame-wise in accordance with the first data frames, wherein encoding and decoding of the data of a first data frame is influenced by other data of the same first data frame PRB1 but not by data of other first data frames PRB2.

In addition in accordance with the second format the first data frames PRB1 are divided into an integer number of second data frames $LLF_0$, wherein the second data frames are shorter than the first data frames and contain the audio data encoded in accordance with the second format. In that respect encoding and decoding of the audio data of a second data frame $LLF_0$ is influenced by other audio data of the same second data frame but not by audio data of another second data frame $LLF_1$. Therefore the audio data from each of the second data frames $LLF_0$ can be decoded and processed in the audio receiver 300 separately and immediately after reception of the respective second data frame $LLF_0$.

In another embodiment the invention concerns a wireless microphone which is configured for operation as a mobile terminal 100 in a mobile communications network and which contains at least one first encoding unit 501, a high-frequency modulation unit SMOD, a microphone unit 580 and a second encoding unit 510. The first encoding unit 501 encodes the data to be transmitted from the terminal in accordance with a first format used in the mobile communications network. The high-frequency modulation unit SMOD is adapted to modulate the data encoded in accordance with the first format, in accordance with a modulation method used in the mobile communications network, wherein the modulated data are transmitted by way of an uplink UL1.

The microphone unit 580 includes a microphone capsule and outputs audio data 58 recorded by the microphone capsule.

The second encoding unit 510 obtains the audio data 58 of the microphone unit 580 and encodes same in accordance with a second format, wherein in accordance with the second format the first data frames PRB1 are divided into an integer number of second data frames $LLF_0$ and wherein the second data frames are shorter than the first data frames and contain the audio data 51 encoded in accordance with the second format.

The high-frequency modulation unit SMOD is also adapted to modulate the audio data 51 encoded in accordance with the second format in accordance with the modulation method used in the mobile communications network, in which case the modulated audio data are also transmitted by way of the uplink UL1.

In that case the first format uses first data frames PRB1 and the terminal 100 encodes and terminates the data frame-wise in accordance with the first data frames, wherein encoding of the data of a first data frame is influenced by other data of the same first data frame PRB1 but not by data of other first data frames PRB2. Likewise the second data frames $LLF_0$ are terminated, that is to say encoding of the audio data of a second data frame $LLF_0$ is influenced by other audio data of the same second data frame but not by audio data of another second data frame $LLF_1$.

In a further embodiment the invention concerns a wireless receiver 300 which is configured for operation in a mobile communications network, with a high-frequency demodulation unit SDEM for demodulation of received data in accordance with a demodulation method used in the mobile communications network, wherein demodulated data are obtained, which are encoded either in accordance with a first format used in the mobile communications network or in accordance with another second format, and further comprising a first decoding unit 601 which decodes those data demodulated by the high-frequency demodulation unit, that are encoded in accordance with the first format used in the mobile communications network, wherein the first format uses first data frames PRB1 and the first decoding unit decodes the data frame-wise in accordance with the first data frames, and a second decoding unit 610 which decodes those data demodulated by the high-frequency demodulation unit, that are encoded in accordance with the second format, wherein in accordance with the second format the first data frames PRB1 are divided into an integer number of second data frames $LLF_0$ and wherein the second data frames are shorter than the first data frames and contain audio data encoded in accordance with the second format.

In that respect the same modulation/demodulation and the same high-frequency range are used independently of the format. The data of the first data frames are terminated, that is to say decoding of the data of a first data frame PRB1 is influenced by other data of the same first data frame but not by data of other first data frames PRB2. The audio data of the second data frame are also terminated, that is to say decoding of the audio data of a second data frame $LLF_0$ is influenced by other audio data of the same second data frame but not by audio data of another second data frame $LLF_1$. Therefore the second decoding unit can decode each of the second data frames immediately after being obtained and output the audio data obtained in that case.

In a further embodiment the invention concerns an audio transmission system comprising at least one wireless microphone operating at a terminal, as described above, a base station and an audio receiver as described above. In that case the terminal can transmit data by way of an uplink in a waveform compatible with the mobile communications network and uses the time slots and frequencies allocated by the base station for transmission both of first frames encoded in accordance with the first format and also second frames encoded in accordance with the second format.

In an embodiment power control of the uplink UL1, for example the transmission strength of the terminal, is preferably effected in accordance with the provisions of the base station 200 or in accordance with the provisions of the audio receiver 300.

Timing advance (TA) or transit time correction is a value for synchronization between uplink and downlink, namely the time shift by which the terminal 100 must transmit earlier so that the signal arrives at the base station 200 in the correct time slot having regard to the signal transit time. Control of the transit time correction in the uplink path UL1 is normally effected by the base station 200. The terminals which are present in the system and which are to simultaneously receive from the audio receiver 300 must therefore transmit with similar transit time correction values TA so that the data arrive at the audio receiver 300 at the correct time; in that respect in an embodiment the audio receiver cannot intervene in the transit time correction. If the respective terminals are within a perimeter of about 300 m that should not cause any problems in regard to OFDM frequency range distortion correction. In another embodiment however the audio receiver 300 can also have an influence on control of the transit time correction in the uplink path UL1 so that the signal arrives at the audio receiver 300 in the correct time slot having regard to the signal transit time. For that purpose in this embodiment the audio receiver 300 can suitably modify the transit time correction predetermined by the base station for terminals. In the system according to the invention, by virtue of a specific form of use, the terminal 100 will normally be much closer to the receiver 300 than to the base station 200. The microphone acting as the terminal and the audio receiver are for example often in the same room. As transit time correction relates to the base station 200 and that does not in any case have to be in a position of receiving the audio signal which is encoded in accordance with the invention, it is possible to dispense with transit time correction at least for the encoded audio signals. Likewise in this case the signal strength of the transmission signal in the uplink UL1 of the terminal can be reduced to such an extent that the signal does not necessarily reach the base station 200, as long as it reaches the audio receiver 300.

In an aspect of the invention there can optionally be a feedback channel from the receiver 300 to the at least one terminal 100 by way of the uplink UL3 of the receiver to the base station 200 and the downlink DL1 from the base station 200 to the terminal 100. The items of control information which are to be transmitted in that case can be transmitted in a higher protocol layer.

In an embodiment of the invention termination of the encoded audio data modulated in accordance with LTE is already effected after one or two OFDM symbols. Accordingly decoding of the audio data can already be effected after one or two OFDM symbols, which reduces the transmission latency in comparison with standard LTE.

Retransmission by the base station 200 can be prevented, for example insofar as UDP (user datagram protocol) is used on the ISO/OSI layer 4 and the H-ARQ (hybrid automated repeat request) is switched off on ISO/OSI layer 2.

The transmission method according to the invention makes it possible to use hardware and signal processing components which are conforming with a mobile communications standard like for example LTE.

In accordance with an aspect of the present invention a base station 200 can be set up in the proximity of the audio receiver 300, in particular if this involves a femto base station of small range.

According to an aspect of the present invention it is possible to enter into consideration of the situation where the location at which the wireless transmission is to take place is at the edge of the radio cell of the base station. To circumvent that problem the base station for example can be in the form an additional femto base station disposed in spatial proximity with the planned event.

The invention can be used for wireless microphone systems which are employed for example in stage technology, for ENG (electronic news gathering) and in PMSE transmissions (programme making and special events), therefore typically in commentary uses by news television teams.

The invention can also be used in communication networks of other (mobile communications) standards. As the audio data an be transmitted with an encoding method alternative to the respective standard, but in conformity with the respective waveform used, the audio data can be transmitted in trouble-free fashion with reduced latency without the alternative encoding method having to be expressly permitted in the respective standard. Furthermore the invention can in principle also be used for other latency-critical data which do not necessarily have to be audio data.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method of low-latency transmission of audio data in a mobile communications network, which has at least one terminal, a base station and an audio receiver, wherein the terminal is at least one of a wireless microphone and a wireless pocket transmitter, the method comprising the steps:

transmitting data from the at least one terminal to the base station, wherein the data are encoded in accordance with a first format and the encoded data are modulated in accordance with a first high-frequency modulation method and transmitted by way of a terminal uplink;

wherein the first format uses first data frames, and the terminal and the base station encode and decode the data frame-wise in accordance with the first data frames;

wherein the encoding and decoding of the data of each of the first data frames is influenced by data of the same first data frame being encoded or decoded but not by data of other first data frames;

transmitting audio data from the at least one terminal, wherein the audio data are encoded in accordance with a second format and the encoded audio data are modulated in accordance with the first high-frequency modulation method and transmitted by way of the terminal uplink established between the terminal and the base station;

wherein in accordance with the second format the first data frames are divided into an integer number of second data frames and wherein the second data frames are shorter than the first data frames and contain the audio data encoded in accordance with the second format; and wherein encoding and decoding of the audio data of each of the second data frames is influenced by audio data of the same second data frame being encoded or decoded but not by audio data of another second data frame;

the audio receiver directly receiving the audio data transmitted by way of the terminal uplink from the terminal to the base station;

wherein transmission of the audio data from the terminal to the audio receiver is effected in a waveform conforming with the mobile communications network; and wherein, in the audio receiver, the audio data from each of the second data frames are decoded and processed separately and immediately after reception of the respective second data frame.

2. The method as set forth in claim 1;
wherein the first high-frequency modulation method converts each of the second data frames into at most two OFDM (orthogonal frequency division multiplex) symbols and the decoder decodes audio data from the at most two OFDM symbols belonging to a second data frame immediately after reception thereof.

3. The method as set forth in claim 1;
wherein a checksum is transmitted in each of the second data frames.

4. The method as set forth in claim 1, further comprising:
configuring the audio receiver with data that specify the terminal uplink to allow the audio receiver to access the terminal uplink.

5. The method as set forth in claim 4;
wherein the base station configures the audio receiver with the data that specify the terminal uplink.

6. The method as set forth in claim 1;
wherein the audio receiver also receives data from the base station by way of an audio-receiver downlink and transmits data to the base station by way of an audio-receiver uplink, wherein the received data from the audio-receiver downlink, the transmitted data from the audio-receiver uplink, or both include at least check data.

7. The method as set forth in claim 1;
wherein the base station allocates to the terminal a continuous succession of first data frames as radio resources and the terminal transmits at least one second data frame in each of the allocated first data frames.

8. The method as set forth in claim 1;
wherein a plurality of different frequency ranges are used for the transmission of the first data frames for various first data frames.

9. The method as set forth in claim 8;
wherein the terminal transmits a plurality of second data frames in each first data frame and wherein the terminal at any time transmits at least two first data frames simultaneously in different frequency ranges associated therewith.

10. The method as set forth in claim 1;
wherein the base station rejects the data frames transmitted from the terminal by way of the terminal uplink, with the audio data encoded in accordance with the second format.

11. A wireless microphone or wireless pocket transmitter that is configured to operate as a mobile terminal in a mobile communications network, comprising:

a first encoding unit configured to encode data to be transmitted by the mobile terminal to a first intended receiver and to a second intended receiver in accordance with a first format used in the mobile communications network, the first intended receiver being a base station of said mobile communications network;

wherein the first format uses first data frames and the mobile terminal encodes the data frame-wise in accordance with the first data frames, and wherein encoding of the data of a first data frame is influenced by data of the same first data frame being encoded but not by data of other first data frames;

a high-frequency modulation unit for modulation of the data encoded in accordance with the first format in accordance with a modulation method used in the mobile communications network, wherein the modulated data are transmitted by way of a terminal uplink from the mobile terminal to said base station being the first intended receiver;

a second encoding unit configured to obtain audio data intended for only the second receiver from a microphone unit and encode the obtained audio data in accordance with a second format, wherein in accordance with the second format the first data frames are divided into an integer number of second data frames, and wherein the second data frames are shorter than the first data frames and contain the audio data encoded in accordance with the second format and wherein encoding of the audio data of each of the second data frames is influenced by audio data of the same second data frame being encoded but not by audio data of another second data frame; and wherein the high-frequency modulation unit is adapted to modulate the audio data encoded in accordance with the second format in accordance with the modulation method used in the mobile communications network, wherein the modulated audio data are also transmitted by way of the terminal uplink, and wherein the second format is a format which the first receiver is not adapted to decode, and wherein the second format is a format which the second receiver is adapted to decode.

12. The wireless microphone or wireless pocket transmitter as set forth in claim 11, further comprising:
 a microphone unit that includes a microphone capsule and outputs audio data recorded by the microphone capsule.

13. A wireless receiver that is configured to operate in a mobile communications network, comprising:
 a high-frequency demodulation unit configured to demodulate received data in accordance with a demodulation method that is used in the mobile communications network, wherein demodulated data are obtained, which are encoded either in accordance with a first format used in the mobile communications network or in accordance with another second format, wherein the same demodulation and the same high-frequency range are used independently of the encoding format;
 a first decoding unit configured to decode those data demodulated by the high-frequency demodulation unit, that are encoded in accordance with the first format used in the mobile communications network;
 wherein the first format uses first data frames and the first decoding unit decodes the data frame-wise in accordance with the first data frames, and wherein decoding of the data of a first data frame is influenced by other data of the same first data frame being decoded but not by data of other first data frames;
 a second decoding unit configured to decode those data which are demodulated by the high-frequency demodulation unit, that are encoded in accordance with the second format;
 wherein in accordance with the second format the first data frames are divided into an integer number of second data frames and wherein the second data frames are shorter than the first data frames and contain audio data encoded in accordance with the second format, and wherein decoding of the audio data of a second data frame are influenced by other audio data of the same second data frame being decoded but not by audio data of another second data frame;
 wherein the second decoding unit decodes each of the second data frames immediately after they are obtained and outputs the audio data obtained in that case; and
 wherein the high-frequency demodulation unit obtains the data encoded in accordance with the first format from a receiver downlink established between the base station and the wireless receiver, and obtains the data encoded in accordance with the second format from an uplink established between the base station and another device of the mobile communications network.

14. An audio transmission system comprising:
 at least one wireless microphone or wireless pocket transmitter operating as a terminal in a mobile communications network, comprising:
  a first encoding unit configured to encode data to be transmitted by the terminal in accordance with a first format used in the mobile communications network;
  wherein the first format uses first data frames and the terminal encodes the data frame-wise in accordance with the first data frames, and wherein encoding of the data of a first data frame is influenced by data of the same first data frame being encoded but not by data of other first data frames;
  a high-frequency modulation unit for modulation of the data encoded in accordance with the first format in accordance with a modulation method used in the mobile communications network, wherein the modulated data are transmitted by way of a terminal uplink;
  a second encoding unit configured to obtain audio data from a microphone unit and encode the obtained audio data in accordance with a second format, wherein in accordance with the second format the first data frames are divided into an integer number of second data frames, and wherein the second data frames are shorter than the first data frames and contain the audio data encoded in accordance with the second format and wherein encoding of the audio data of each of the second data frames is influenced by audio data of the same second data frame being encoded but not by audio data of another second data frame; and
  wherein the high-frequency modulation unit is adapted to modulate the audio data encoded in accordance with the second format in accordance with the modulation method used in the mobile communications network, wherein the modulated audio data are also transmitted by way of the terminal uplink;
 a base station; and
 an audio receiver that is configured to operate in the mobile communications network, comprising:
  a high-frequency demodulation unit configured to demodulate received data in accordance with a demodulation method that is used in the mobile communications network, wherein demodulated data are obtained, which are encoded either in accordance with the first format or in accordance with the second format, wherein the same demodulation and the same high-frequency range are used independently of the encoding format;
  a first decoding unit configured to decode those data demodulated by the high-frequency demodulation unit, that are encoded in accordance with the first format used in the mobile communications network;
  wherein the first decoding unit decodes the data frame-wise in accordance with the first data frames, and wherein decoding of the data of a first data frame is influenced by other data of the same first data frame being decoded but not by data of other first data frames;
  a second decoding unit configured to decode those data which are demodulated by the high-frequency demodulation unit, that are encoded in accordance with the second format;
  wherein decoding of the audio data of a second data frame are influenced by other audio data of the same second data frame being decoded but not by audio data of another second data frame; and
  wherein the second decoding unit decodes each of the second data frames immediately after they are obtained and outputs the audio data obtained in that case;
 wherein the terminal is adapted to transmit data by way of the terminal uplink in a waveform which is in conformity with a waveform used in the mobile communications network;
 wherein the base station allocates to the terminal frequencies and time slots for transmission of the first frames; and
 wherein the terminal uses the allocated frequencies and time slots for transmitting both the first frames encoded in accordance with the first format and also the second frames encoded in accordance with the second format.

15. The audio transmission system as set forth in claim 14; wherein the audio receiver is also configured to transmit data by way of an audio-receiver uplink to the base station, wherein the received data, the transmitted data, or both include at least check data.

16. The audio transmission system as set forth in claim 14; wherein the audio receiver contains one or more configuration data units configured to store first and second configuration data received by the base station, wherein the first configuration data specify the audio-receiver uplink, an audio-receiver downlink of the audio receiver, or both, and the second configuration data specify the terminal uplink.

17. The audio transmission system as set forth in claim 14; wherein the terminal uses a signal strength in respect of the transmission in the terminal uplink, that is reduced in comparison with a provision of the base station.

18. The wireless receiver as set forth in claim 13; wherein the wireless receiver is configured by the base station to receive said data from the uplink established between the base station and said another device.

\* \* \* \* \*

UNITED STATES PATENT AND TRADEMARK OFFICE
CERTIFICATE OF CORRECTION

PATENT NO. : 10,979,474 B2
APPLICATION NO. : 16/475811
DATED : April 13, 2021
INVENTOR(S) : Thomas Haustein et al.

It is certified that error appears in the above-identified patent and that said Letters Patent is hereby corrected as shown below:

On the Title Page

Item (72) Inventor Sebastian Georgi address should read: -- Langenhagen, DE -- instead of "Langenhangen, DE"

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*